United States Patent [19]
Kato et al.

[11] Patent Number: 5,014,406
[45] Date of Patent: May 14, 1991

[54] ELASTIC FIXING ROLLER AND METHOD OF PRODUCING THE SAME

[75] Inventors: Chiaki Kato; Masaya Nishi; Toshiyuki Hatta, all of Osaka, Japan

[73] Assignee: Sumitomo Electric Industries, Ltd., Osaka, Japan

[21] Appl. No.: 364,307

[22] Filed: Jun. 12, 1989

Related U.S. Application Data

[62] Division of Ser. No. 259,729, Oct. 19, 1988, Pat. No. 4,887,394.

[30] Foreign Application Priority Data

| Oct. 20, 1987 | [JP] | Japan | 62-266127 |
| Oct. 31, 1987 | [JP] | Japan | 62-276985 |
| Nov. 20, 1987 | [JP] | Japan | 62-294740 |
| Dec. 30, 1987 | [JP] | Japan | 62-335073 |
| Dec. 30, 1987 | [JP] | Japan | 62-335074 |

[51] Int. Cl.⁵ .............................................. B21B 31/08
[52] U.S. Cl. .......................................... 29/130; 29/132
[58] Field of Search .................... 29/132, 130; 118/60, 118/70, 264, 268; 432/60

[56] References Cited

U.S. PATENT DOCUMENTS

| 3,593,398 | 7/1971 | Hess et al. | 29/132 |
| 4,064,313 | 12/1977 | Takiguichi et al. | 29/132 |
| 4,078,286 | 3/1978 | Takiguichi et al. | 29/132 |
| 4,084,500 | 4/1978 | Brown et al. | 29/132 |
| 4,368,568 | 1/1983 | Watanabe | 29/132 |
| 4,375,505 | 3/1983 | Newkirk | 29/132 |
| 4,466,164 | 8/1984 | Tadokoro et al. | 29/132 |
| 4,844,953 | 7/1989 | Kato et al. | 29/132 |

*Primary Examiner*—Howard N. Goldberg
*Assistant Examiner*—I. Cuda
*Attorney, Agent, or Firm*—Cushman, Darby & Cushman

[57] ABSTRACT

A fixing roller for use in the fixing stage of a fixing apparatus such as a copying machine provided with multiple rubber and/or fabric layers of certain thicknesses and hardnesses surrounding a core member to improve the copying characteristics of the roller.

7 Claims, 3 Drawing Sheets

ELASTIC FIXING ROLLER AND METHOD OF PRODUCING THE SAME

This is a division of application Ser. No. 07/259,729, filed Oct. 19, 1988, now U.S. Pat. No. 4,887,394.

FIELD OF THE INVENTION

The present invention relates to a fixing roller for use in the fixing stage or copying machines, facsimile equipment, line printers and like systems. More particularly, the fixing roller of the present invention is provided with multiple rubber and/or fabric layers of certain thicknesses and hardnesses surrounding a core member to improve the copying characteristics of the roller.

BACKGROUND OF THE INVENTION

In a typical fixing apparatus, such as a copying machine, a piece of copy paper having an unfixed toner picture adhered thereto is passed between rubber heating and pressing rollers to fix the toner picture to the copy paper. However, numerous problems are associated with the use of conventional rubber fixing rollers which are commonly coated with a fluorocarbon resin. Because the resin has no elasticity, the heating roller tends to crush the toner, thereby lowering the picture quality of the copy. Lack of elasticity also lowers the heat conductivity of the roller resulting in poor toner fixing, a particular problem in high-speed copying machines. A roller that lacks elasticity also tends to wrinkle the copy paper.

A heating roller coated with a heat-resistant rubber also creates problems in the copying process. The separating pawls of the copying machine often damage the rubber coating when a copier becomes jammed with paper, thereby shortening roller life. Further, such a roller has poor toner releasing properties which tends to offset the toner and, thus, lower the picture quality of the copy.

Unexamined Japanese Patent Publication No. 60-179770 [hereinafter referred to as the Japanese Publication], filed by the same applicant herein, discloses improving the useful life of rubber rollers by using a rubber layer of porous ethylene tetrafluoride resin impregnated with liquid silicone rubber.

The roller disclosed in the Japanese Publication, however, also has problems associated with its use. One such problem concerns the rubber hardness which cannot be made with less than a Shore hardness of 50 degrees and, consequently, is too high. Also, because of polishing, the roller surface has uneven portions of several micrometers resulting in reduced toner releasing properties, particularly when the roller is used for color copying and like processes. In that case, the roller preferably has a mirrored surface to produce a glossy picture. Furthermore, when a porous material such as ethylene tetrafluoride resin is used to coat the roller, it is impossible to impregnate the pores of the material with a liquid rubber having a high viscosity (10,000 c.s. or more) generally used in a liquid injection molding system (LIMS). This is because the pore diameter is very fine, about 20 $\mu$m at the most, which limits the quantity of filler that can be used to improve the copying characteristics of the roller.

SUMMARY OF THE INVENTION

An object of the present invention is to provide a fixing roller that solves the foregoing problems in the prior art and to provide a method for producing such a roller. To attain that object, according to a first embodiment of the present invention, the fixing roller comprises a roller core; a first heat-resistant rubber layer provided on an outer surface of the roller core; a second heat-resistant rubber layer provided on the outer surface of the first heat-resistant rubber layer, the second heat-resistant rubber layer being reinforced at its outer surface by a heat-resistant porous material; and a thin third heat-resistant rubber layer provided on the outer surface of the second heat-resistant rubber layer.

A method of producing the first embodiment of the fixing roller of the present invention involves the steps of setting the heat-resistant porous material inside a metal mold having a mirror-finished inner surface; setting the roller core at the center of the mold; pouring liquid rubber between the roller core and the porous material to impregnate the porous material with the liquid rubber; and removing the contents of the mold after hardening.

Another method of producing the first embodiment of the fixing roller of the present invention involves the steps of providing a heat-resistant rubber layer on the outer surface of the roller core; coating the heat-resistant rubber layer with a heat-resistant porous material; impregnating the heat-resistant porous material with liquid rubber; hardening the liquid rubber; polishing the resultant roller to improve its roundness; and forming a thin heat-resistant rubber coating film on the outside of the polished roller using a liquid phase method.

A second embodiment of the elastic fixing roller of the present invention comprises a roller base member similar to that disclosed in the Japanese Publication having a porous layer of fluorocarbon resin provided on the outer surface of the roller base member, the porous material having porous portions impregnated with heat-resistant liquid rubber, the liquid rubber being hardened after impregnation. To enlarge the pore size of the porous portions, the porous material is formed by extending and baking the fluorocarbon resin filled with an inorganic filler having a particle size no larger than 5 $\mu$m. The liquid rubber contains an inorganic filler and/or a releasing agent to provide the roller with heat resistance, heat conductivity, electrical conductivity, and releasing properties.

A third embodiment of the elastic fixing roller of the present invention comprises a roller core; a layer provided on the outer surface of the roller core made of a reinforcing heat-resistant material impregnated with a reinforcing heat-resistant elastic material that is hardened after impregnation; and a thin film of a heat-resistant elastic material provided on the outer surface of the heat-resistant layer.

A fourth embodiment of the elastic fixing roller of the present invention comprises a roller core and a layer provided on the outer surface of the roller core made of either a woven or nonwoven fabric of heat-resistant fibers, the selected fabric being impregnated with liquid heat-resistant rubber and then hardened.

A fifth embodiment of the elastic fixing roller of the present invention comprises a roller core; a first heat-resistant rubber layer provided on the outer surface of the roller core; and a second heat-resistant rubber layer provided on the outer surface of the first heat-resistant rubber layer, the second heat-resistant rubber layer being reinforced by either a heat-resistant porous material or heat-resistant fibers exposed at the outer surface of the second heat-resistant rubber layer.

DETAILED DESCRIPTION OF THE PREFERRED EMBODIMENTS

Figure 1:
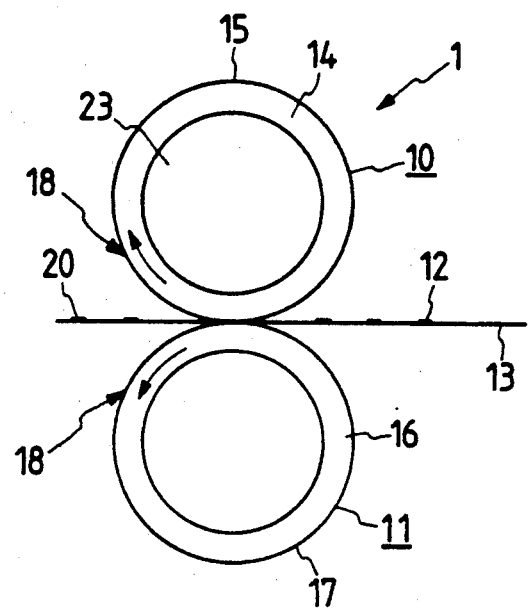
FIG. 1 is a cross-sectional view of a fixing stage of a fixing apparatus.

FIG. 1 shows a typical fixing stage 1 of a copying machine. Copy paper 13 having an unfixed picture of toner 12 transferred thereon is passed between a set of fixing rollers comprising a heating roller 10 and a pressing roller 11. A heater 23, located inside the core 14 of roller 10, provides a source of heat for roller 10. The heat generated by roller 10, generally in the range of 170°-200° C., and the pressure exerted by roller 11 fix toner 12 onto copy paper 13 resulting in a fixed picture 20.

Heating roller 10 is formed with a roller base member or core 14 which can be manufactured from ceramics, plastics, or a metal material such as aluminum. To increase the releasing properties of the toner, the surface of roller core 14 is provided with a coating 15 of fluorocarbon resin several tens $\mu$m thick or with a coating of silicone rubber or fluororubber having a thickness of 1 mm or less. Pressing roller 11 is formed with an aluminum roller core 16 having a coating 17 of heat-resistant rubber, such as silicone rubber, several millimeters thick having a Shore hardness of ten degrees.

FIG. 1 further shows separating pawls 18 each having a width of several millimeters attached at four or five portions to prevent copy paper 13 from winding around the roller. Separating pawls 18 generally are provided only on the heating roller. However, in a high-speed copying machine, or an automatic double-surface copying machine separating pawls are provided on both the heating and pressing rollers, as shown in FIG. 1.

Figure 3:
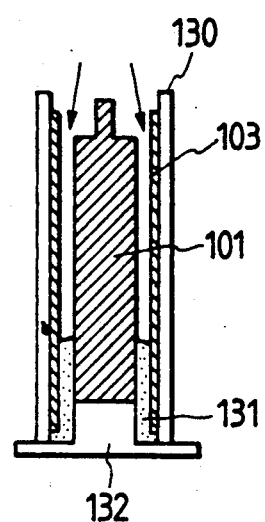
FIG. 3 is a cross-sectional view of a mold for producing an elastic fixing roller according to the first embodiment of the present invention.
Figure 2:
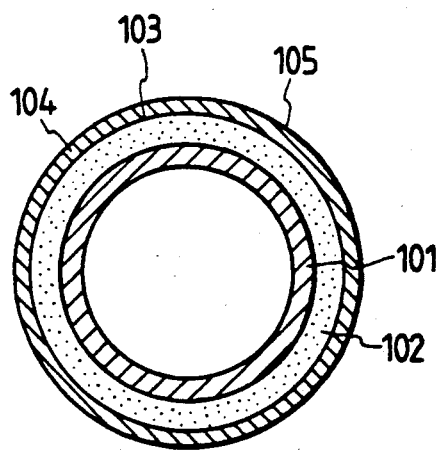
FIG. 2 is a cross-sectional view of an elastic fixing roller according to a first embodiment of the present invention.

FIGS. 2 and 3 represent a first embodiment of the present invention. As shown in FIG. 2, the elastic fixing roller has a roller core 101 made of a metal, ceramic, plastic, or the like. A heat-resistant rubber layer 102 is provided on the outer surface of roller core 101. A second heat-resistant rubber layer 104, reinforced by a heat-resistant porous material 103 such as, for example, a porous tube of fluorocarbon resin or the like, is formed on the outer surface of rubber layer 102. The outermost layer of the roller is a thin heat-resistant rubber layer 105, preferably 0.2 mm or less in thickness. Rubber layer 105 may be formed by monobloc molding using a metal mold or by a liquid phase method after grinding.

The heat-resistant rubber may contain an inorganic filler to raise its heat-resistance and electrical conductivity. In addition, a silicone oil may be added to the heat-resistant rubber to raise its releasing properties.

The elastic fixing roller according to the first embodiment of the present invention, as well as the other embodiments to be described, can be used either as a heating or pressing roller or as a roller that must be heat-resistant.

FIG. 3 illustrates a method for manufacturing the elastic fixing roller according to the first embodiment of the present invention. First, the heat-resistant porous material 103 is set inside a hollow metal mold 130 having a mirrored inner surface, and roller core 101 is set at the center of mold 130 atop a metal roller core fitting 132. Liquid rubber 131, for example, silicone rubber or the like, is poured between roller core 101 and porous material 103 to fill the space therebetween to form the heat-resistant rubber layer 102. After the silicone rubber 131 has hardened the elastic fixing roller is removed from the mold.

Alternatively, the elastic fixing roller according to the first embodiment of the present invention may be produced by first forming heat-resistant rubber layer 102 on the outer surface of roller core 101, and then covering layer 102 with the heat-resistant porous material 103. The porous material 103 is then impregnated with the liquid rubber 104 and hardened. After the surface of the resultant roller is polished to improve its roundness, the thin heat-resistant rubber coating 105 is formed using a liquid phase method.

The formation of coating 105 by the liquid phase method is carried out by applying, for example, a thin, self-adhesive coating of liquid silicone rubber of room temperature vulcanizing (RTV), that hardens at room temperature and is self-adhesive and possesses superior releasing properties.

In summary, the elastic fixing roller described above is arranged so that a first heat-resistant rubber layer is formed on the outer surface of a roller core, a second heat-resistant rubber layer reinforced by a heat-resistant porous material is formed on the outer surface of the first rubber layer, and a thin heat-resistant rubber layer several hundred $\mu$m thick or less is formed as the outermost layer of the roller. The second rubber layer reduces the possibility that the outermost rubber layer will be damaged due to separating pawls or a thermistor and, thus, extends the life of the rubber roller.

The fixing roller disclosed in the Japanese Publication uses a porous material of ethylene tetrafluoride resin impregnated with liquid silicone rubber and is polished after hardening. However, the Shore hardness of the impregnated porous material after the liquid silicone rubber has hardened is more than 50 degrees. It was impossible to reduce the Shore hardness below 50 degrees by polishing or other methods.

Although a fixing apparatus having a wide nip width (the width of the contact between the rollers) for fixing toner under as low a pressure as possible is generally required, the use of a conventional fixing roller is limited due to its Shore hardness.

According to the first embodiment of the present invention, it is possible to produce an elastic fixing roller having a Shore hardness of 30 degrees or less if the thickness of the heat-resistant porous material is reduced. Furthermore, the thin outermost heat-resistant rubber coating provides a glossy outer surface on the elastic fixing roller making it extremely effective for color copying and like processes requiring gloss.

Furthermore, where a silicone oil is used as a releasing agent to coat the surface of the elastic fixing roller, the wetability/compatibility of a silicone oil is increased so that the realeasing effect of the toner or copy paper from the roller is increased.

For purposes of example only, the first embodiment of the present invention can be made according to the following specifications: Hollow metal mold 130 is made of SUS304 grade stainless steel having an inner diameter of 40 mm, a thickness of 5 mm, a length of 350 mm, and a mirror-finished inner surface; roller core 101 is made of aluminum having an outer diameter of 34 mm, a thickness of 2 mm, and a length of 320 mm; and metal core fitting 132 is made of SUS304.

To carry out the method of producing the fixing roller according to the first embodiment of the present invention, a porous tube of ethylene tetrafluoride resin (trade name POREFLON, made by SUMITOMO ELECTRIC INDUSTRIES Co., Ltd.) having an outer diameter of 40 mm, a thickness of 0.8 mm, a pore size of 10 μm, and a porosity of 85% was set inside the hollow metal mold, and the metal core coated with a primer was set at the center of the mold. Liquid silicone rubber (trade name KE103, made by SHIN-ETSU CHEMICAL Co., Ltd.) having a viscosity of 1100 c.s. was poured between the metal core and the porous tube and hardened at 200° C. for one hour after defoaming. Thereafter, the resultant elastic fixing roller was removed from the mold.

The Shore hardness of the rubber roller described above was approximately 35 degrees, which was only about 20 degrees higher than the hardness of the KE103 itself. The thickness of the outermost thin film was 0.05-0.1 mm providing a mirrored surface.

Figure 4:
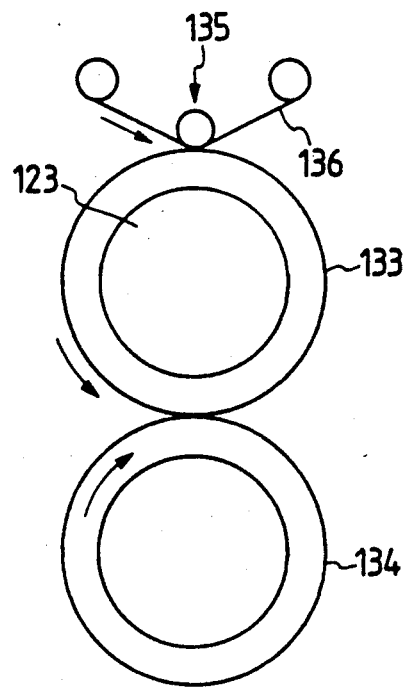
FIG. 4 is a cross-sectional view of a fixing apparatus employing the elastic fixing roller of FIG. 2.

Excellent picture quality was obtained using the aforementioned roller as a heating roller in the fixing stage of a color copier as shown in FIG. 4 where reference numerals 123, 133, 134, 135, and 136 represent a heater, heating roller, pressing roller, contact roller, and web, respectively. A nip width of 4 mm between the heating and pressing rollers was sufficient.

For comparison purposes, the fixing roller disclosed in the Japanese Publication, in which a porous tube of ethylene tetrafluoride resin was disposed inside the roller, had a Shore hardness of 60 degrees and, therefore, provided insufficient nip width.

The elastic fixing roller according to the first embodiment of the present invention is superior to conventional rollers in several ways. First, use of the roller is less likely to wrinkle the copy paper. In addition, the rubber layer cannot be damaged by separating pawls or a thermistor, thus extending the life of the roller. Further, the elastic fixing roller according to the present invention has superior releasing properties due to its mirrored surface. Also, because the hardness of the roller is low, the picture quality obtained by the roller is excellent.

Figure 5:
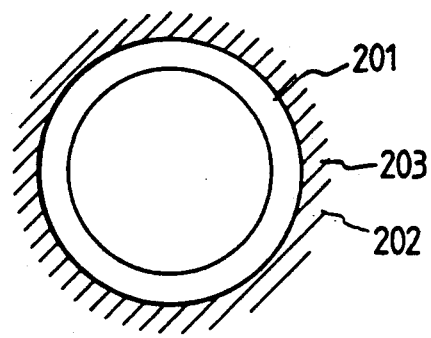
FIG. 5 is a cross-sectional view showing an elastic fixing roller according to a second embodiment of the present invention.
Figure 6:
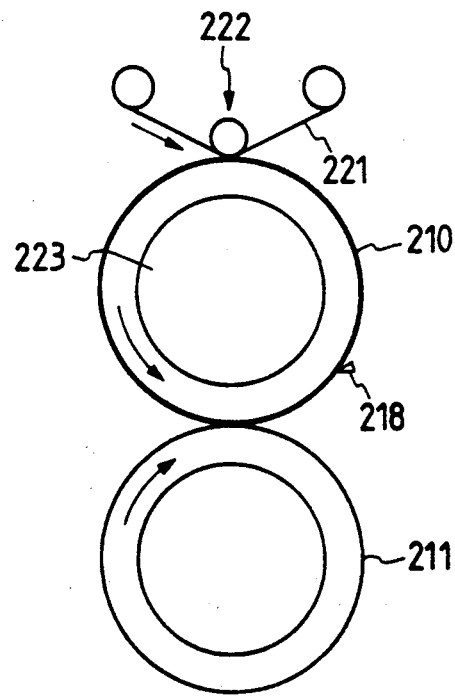
FIG. 6 is a cross-sectional view showing a fixing apparatus employing the elastic fixing roller of FIG. 5.

FIGS. 5 and 6 illustrate a second embodiment of the present invention. FIG. 5 shows an elastic fixing roller having a continuous porous layer 202 of fluorocarbon resin, containing 2-30 portions of inorganic filler to enlarge its pore size, formed on the outer surface of roller core 201. The core can be made of metal, ceramic, plastic, or the like. The porous portions of layer 202 are impregnated with a heat-resistant liquid rubber 203, in which an inorganic filler of particle size no larger than 5 μm and/or a releasing agent is added by 0.1-20 portions, and then hardened. Ethylene tetrafluoride resin having a porosity of 70-95% and a pore size of 1-50 μm is preferably used as the fluorocarbon resin porous layer 202. It is further preferable to use liquid silicone rubber or fluororubber having a Shore hardness of 20-70 degrees and a viscosity of 10,000 c.s. or less as the heat-resistant liquid rubber 203.

The elastic fixing roller described above provides many benefits. The fluorocarbon resin exposed on the surface of the roller at a predetermined rate results in better toner releasing properties than that of rubber alone. Further, the elasticity of the roller prevents it from crushing the toner, allows sufficient heat conduction for proper fixing, and prevents the copy paper from wrinkling. In addition, the tensile strentgh of the roller is higher than that of a conventional rubber roller because the elastic fixing roller has a reinforced arrangement of fluorocarbon resin fibers that form pores having a netty arrangement extending into the rubber. This helps prevent damage to the roller caused by the separating pawls of a copying machine.

Also, the rubber hardness of the composite layer of the fluorocarbon resin and the elastic material is higher than that of the elastic material taken alone. It is necessary to use an elastic material having a Shore hardness lower than 15 degrees to make the rubber hardness of the composite layer less than 35 degrees. However, such rubber has low tensile strength and poor heat-resistance so that the surface of the rubber will begin to separate after thousands of copies are made which lowers the picture quality of the copies and decreases the releasing properties of the roller. On the other hand, if the Shore hardness of the composite layer exceeds 80 degrees, the nip width narrows which tends to lower the degree to which the toner fixes to copy paper.

It is possible to improve roller performance by adding certain inorganic fillers and/or releasing agents to the liquid rubber. For example, to increase the heat-resistance of the rubber, iron oxide red, carbon black, or silica is added. A higher heat conductivity is achieved by adding graphite or metal powder to the liquid rubber. To increase electrical conductivity, carbon black or metal powder can be added. Silicon oil is added to the liquid rubber to increase the releasing properties of the rubber.

The fixing roller described in the Japanese Publication is disclosed as having a pore size of about 10 μm and a porosity of ethylene tetrafluoride resin of at least 90%, so that, at most, five portions of an inorganic filler and/or a releasing agent could be added to the liquid rubber and it takes a considerably long time for the liquid rubber to impregnate the resin.

According to the second embodiment of the present invention, an inorganic filler also is added to the fluorocarbon resin by 2-30 portions to increase pore size and porosity thereby making it possible to increase the quantity of the filler and/or releasing agent to be added to the liquid rubber. This improves the roller characteristics and reduces the time necessary to impregnate the liquid rubber. When less than two portions of inorganic filler was added to the fluorocarbon resin, its pore size and porosity did not significantly increase. Use of more than 30 portions of inorganic filler made it impossible to produce the porous material. On the other hand, when the quantity of the filler and/or releasing agent to be added to the liquid rubber is less than 0.1 portions, no satisfactory effect could be obtained; when it exceeded 20 portions, it was impossible to impregnate the porous material.

As described above, the elastic fixing roller according to the second embodiment of the present invention used in a fixing apparatus of a copying machine or the like, achieves excellent results which are difficult to obtain using conventional rollers. The roller causes little wrinkling of the copy paper and the picture quality is excellent. The rubber layer will not be damaged by separating pawls, a thermistor, or the like, thus extending the life of the roller. Further, the time necessary to raise the temperature of the roller and to impregnate it with liquid rubber can be reduced.

Referring to FIGS. 5 and 6, examples of the second embodiment of the present invention was made according to the following specifications:

An aluminm roller core 201 has a degreased surface, a roller diameter of 59.8 mm, and a length of 320 mm. A porous tube 202 of ethylene teraflouride resin, having a thickness of 0.8 mm, a porosity of 90% and a pore size of 15 μm, is formed by inpregrating ten portions of graphite into a PTFE resin, extended and baked from 100% to 800% in a longitudinal direction and from 100% to 200% in a radial direction. The aluminum roller core 201 is covered with the porous tube 202.

Porous tube 202 was impregnated with liquid silicone rubber 203 having a viscosity of 5,000 c.s. and added along with 5 portions of graphite having a particle size of 0.5 μm and 10 portions of silicone oil having a viscosity of 100 c.s. After hardening, the surface of porous tube 202 was polished to obtain an elastic roller having an outer diameter of 60.8 mm and was provided with an inverted crown of 100 μm.

For testing purposes, the elastic roller of FIG. 5 was used as a heating roller 210 of a fixing apparatus, as shown in FIG. 6, attached to a copying machine capable of delivering 50 copies per minute using A4 paper (paper size No. 4 of series A paper under Japanese standards). A web 221 of NOMEX impregnated with a small quantity of silicone oil was used as a cleaning member on the outer surface of the heating roller 210. As shown in FIG. 6, web 221 rotates in a direction opposite to that of heating roller 210. In this case, the temperature rising time of the roller was about three minutes. After 200,000 continuous copies, the roller was not damaged by the separating pawls 218 and was still in satisfactory condition for further use.

For comparison purposes, PFTE resin added with no filler was extended and baked under the same conditions as those of described in the first example above. The porous tube had a thickness of 0.8 mm, a porosity of 85%, and the pore size was 5 μm. The tube was impregnated with liquid silicone rubber filled with graphite particles of 0.5 μm. In this case it was impossible to impregrate the tube with more than one portion of liquid silicone rubber. The temperature rising time of the roller in this case was about 3.5 minutes.

In a second example, a roller core having the same roller diameter as that of the first example was covered with a porous tube of ethylene tetrafluoride resin so that PTFE resin added with twenty portions of iron oxide red was extended and baked from 100% to 800% in a longitudinal direction and from 100% to 300% in a radial direction. The porous tube had a thickness of 0.5 mm, a porosity of 90% and a pore size of 15 μm. The porous tube was impregnated with liquid silicone rubber having a viscosity of 5,000 c.s. added with five portions of iron oxide red so that the thickness of the porous tube coated with the silicone rubber was 0.5 mm larger than the original porous tube. The surface of the outermost silicone rubber layer was polished to produce a roller in which the ethylene tetrafluoride resin porous tube was exposed on the surface of the roller.

For testing purposes, the roller was used as a heating roller in the same fixing apparatus as that of the first example. Any damage was caused, if at all, by the separating pawls 218, so that excellent picture quality was obtained up to 400,000 copies.

Figure 7:
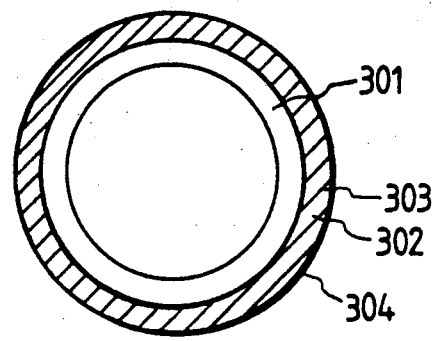
FIG. 7 is a cross-sectional view showing an elastic fixing roller according to a third embodiment of the present invention.
Figure 8:
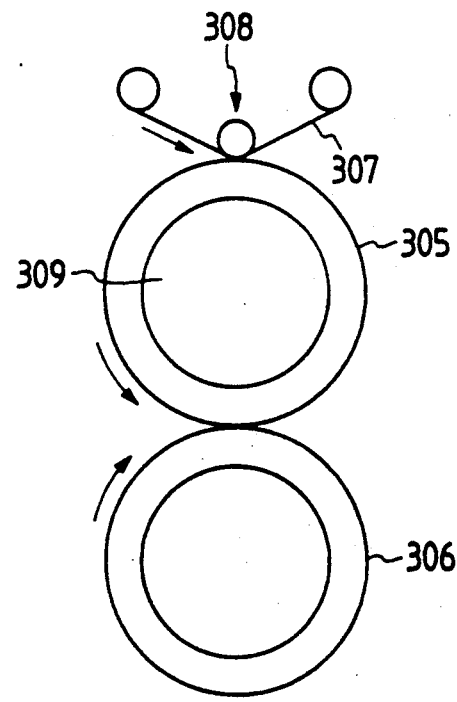
FIG. 8 is a cross-sectional view of a fixing apparatus employing the elastic fixing roller of FIG. 7.

FIGS. 7 and 8 illustrate a third embodiment of the present invention. In FIG. 7, the elastic fixing roller is provided with a continuous porous layer 302 of fluorocarbon resin surrounding the outside of a roller core 301 made of metal, ceramics, plastics, or the like. Porous layer 302 is impregnated with heat-resistant liquid rubber 303, hardened, and then polished to obtain the correct roundness. A thin liquid rubber coating 304 having a low viscosity is applied and hardened to reduce the roughness of the surface thereby making the surface glossy to increase the toner releasing properties of the roller. This roller is particularly effective for use in color copying.

Taking into consideration the releasing properties and handling of the roller, it is preferable to use liquid silicone rubber which hardens at room temperature as the heat-resistant liquid rubber. However, the liquid silicone rubber used for surface coating is not always required to have the same grade as that used to impregnate the porous rubber layer.

It is also preferable to use liquid silicone rubber having a Shore hardness of 80 degrees or less after hardening and a viscosity of 100,000 c.s. or less to impregnate layer 302. The liquid silicone rubber forming the outermost layer preferably has a Shore hardness of 100 degrees or less after hardening at room temperature and a viscosity of 10,000 c.s. or less.

In this arrangement, for example, a layer of woven or nonwoven polyamide fabric or the like or a layer of carbon fibers may be substituted for the continuous porous layer of fluorocarbon resin.

Again, excellent results can be obtained using the roller just described. The surface of the roller is glossy which improves its releasing properties and elasticity. Further, the tensile strength of the roller is higher than that of conventional rubber rollers. The reinforced arrangement of fluorocarbon resin fibers form pores that have a netty arrangement extending into rubber which prevents the separating pawls from damaging the roller. However, the pawls may damage the roller if the outermost heat-resistant rubber layer is too thick and, therefore, the outermost layer is preferably 0.2 mm thick or less, ideally several tens μm thick, so that the uneven flat portion of the roller becomes an even polished surface. Such a surface is obtained by applying liquid rubber of the solvent dilution type, having low viscosity and a superior adhesive property, to the surface by means of a roller or the like.

The third embodiment of the present invention was made using an aluminum core having a degreased surface and a roller diameter of 40 mm. A length of 32 mm of the core was made adhesive and coated with a porous tube of ethylene tetrafluoride resin having a thickness of 2.5 $\mu$m, a porosity of 80%, and a pore size of 2 $\mu$m. The porous tube was impregnated with two-part liquid silicone rubber (trade name KE 103, made by SHIN-ETSU CHEMICAL Co., Ltd.) and then hardened at room temperature. The surface of the porous tube was then polished to an outer diameter of 44 mm and a surface roughness of 10 $\mu$m. The roller surface was then coated with one-part liquid silicon rubber (trade name S-COAT 58, made by SHIN-ETSU CHEMICAL Co., Ltd.), approximately 20 $\mu$m thick and hardened at room temperature. The surface roughness was about 2 $\mu$m creating a glossy surface. The Shore hardness of the rubber roller was 60 degrees at ordinary temperatures and 45 degrees when the roller was heated to 200° C.

Referring to FIG. 8, the roller described above was used as a heating roller 305 in a fixing apparatus which was attached to a full-color copying machine capable of producing ten copies per minute using A4 paper. Reference numerals 306, 308, and 309 designate a pressing roller, a contacting roller, and a heater, respectively. A web 307 of NOMEX impregnated with a small quantity of silicone oil was used as a cleaning member on the outer surface of roller 305. Web 307 rotates in a direction opposite to that of roller 305.

Using this setup, excellent picture quality was attained with no offset up to 20,000 copies. For comparison test purposes, the same roller as that of the foregoing example was used in a color copying machine except that the surface was not coated with one-part liquid silicone rubber but only polished. In that case, the picture quality of the color copies was less glossy, and after several tens copies, offset occurred preventing further copying.

Figure 9:
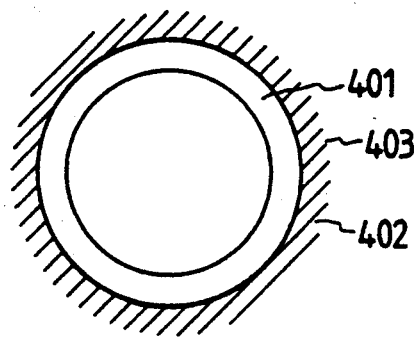
FIG. 9 is a cross-sectional view showing the elastic fixing roller according to a fourth embodiment of the present invention.
Figure 10:
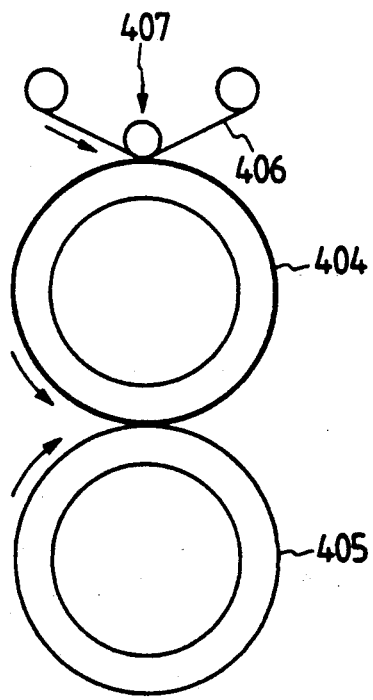
FIG. 10 is a cross-sectional view showing a fixing apparatus employing the elastic fixing roller of FIG. 9.

FIGS. 9 and 10 illustrate a fourth embodiment of the present invention. In FIG. 9, a woven or nonwoven fabric layer 402 of heat-resistant fibers, for example, fluorocarbon resin fibers, carbon fibers, metal fibers, polyamide fibers, or the like, is provided on the outer surface of a roller core 401 made of either metal, ceramics, plastics, or the like. Fabric layer 402 is then impregnated with heat-resistant liquid rubber 403 and hardened.

In this embodiment, silicone rubber of fluororubber having high viscosity is used as the heat-resistant liquid rubber. The roller can be easily constructed if molding is performed using a liquid silicone rubber injection molding system (LIMS).

Generally, an inorganic filler such as iron oxide red, silica, or the like is added to the liquid rubber to raise the heat-resistance and electrical conductivity of the roller, and silicone oil is added to the liquid rubber to raise its releasing properties.

In this embodiment, damage due to separating pawls or a thermistor of a copying machine is lessened and, thus, roller life is prolonged, because the rubber is reinforced by the woven or nonwoven fabric of fluorocarbon resin or by the conductive woven or nonwoven fabric of carbon, metal, or the like.

In the fixing roller disclosed in the Japanese Publication in which the porous ethylene tetrafluoride resin is impregnated with liquid silicone rubber and then polished after hardening, the viscosity of the liquid silicone rubber and the particle size and quantity of the filler is limited. No such limitations are present in the elastic fixing roller according to the fourth embodiment of the present invention.

An example of the fourth embodiment of the present invention was made using a metal core having a degreased surface and a roller diameter of 40 mm. A length of 320 mm of the core was coated with a silicone rubber primer and dried. A fluorocarbon resin, nonwoven fabric layer, 3 mm thick, was formed on the outer surface of the metal core and impregnated with liquid silicone rubber (trade name KE 1331, made by SHIN-ETSU CHEMICAL Co., Ltd.) having a viscosity of 30,000 c.s., a Shore hardness of 40 degrees, and a tensile strength of 35 kg/cm$^2$, and then hardened at 200° C. for five hours. The surface of the resultant outer layer was polished by an external cylindrical grinding machine to an outer diameter of 45 mm. The surface has a 10:1 ratio of silicone rubber and fluorocarbon resin fibers. The coating layer of the roller had a Shore hardness of 70 degrees and a tensile strength of 60 kg/cm$^2$.

Referring to FIG. 10, the roller was used as a heating roller 404 in a fixing apparatus which was attached to a copying machine capable of making 50 copies per minute of A4 paper. Reference numerals 405, 406, and 407 designate a pressing roller, a web, and a contacting roller, respectively. A web 406 of NOMEX impregnated with a small quantity of silicone oil was used as a cleaning member on the outer surface of the heating roller 404. As shown in FIG. 10, web 406 rotates in a direction opposite to that of heating roller 404. Once again, excellent results were obtained using the fourth embodiment of the present invention. Up to 200,000 copies, the roller was undamaged by the separating pawls and no wrinkling of the paper occurred, producing excellent picture quality.

Figure 11:
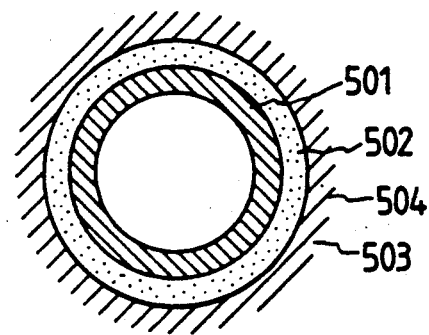
FIG. 11 is a cross-sectional view showing the elastic fixing roller according to a fifth embodiment of the present invention.
Figure 12:
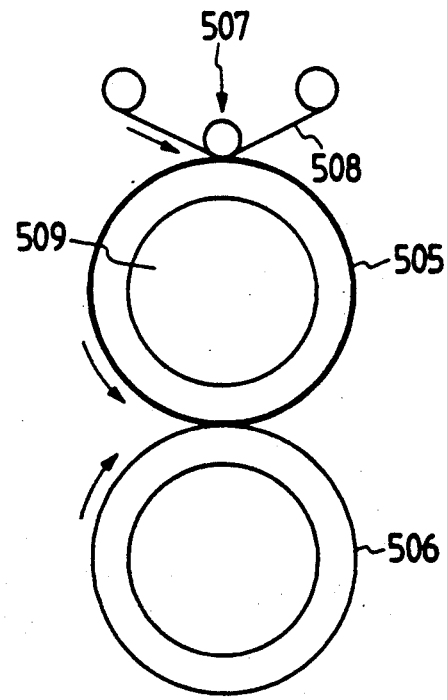
FIG. 12 is a cross-sectional view showing a fixing apparatus using the elastic fixing roller of FIG. 11.

FIGS. 11 and 12 illustrate a fifth embodiment of the present invention. FIG. 11 shows a heat-resistant rubber layer 502 formed on the outside of a roller core 501 made of metal, ceramics, plastics, or the like. A heat-resistant rubber layer 504 reinforced by heat-resistant porous material or fibers 503 is formed on the outer surface of rubber layer 502.

In this embodiment, a porous material or a woven or nonwoven fabric of fluorocarbon resin may be used if the releasing properties of the surface is an important consideration, and a woven or nonwoven fabric of conductive fibers such as carbon, metal, or the like may be used if electrical conductivity is required. A liquid silicone rubber having a viscosity of 100,000 c.s. or less is generally used as the heat-resistant rubber layer. Further, an even higher performance roller can be obtained if an inorganic filler such as iron oxide red, silica, or the like is added into the liquid rubber to further raise the heat-resistance of the roller or if a releasing agent such as silicone oil or the like is added to raise the releasing properties of the roller. The surface of the elastic fixing roller is polished to improve its roundness and to expose a mixed layer on the outer surface of the roller.

In this embodiment, as in the other embodiments, the life of the roller is prolonged. That is because the rubber is reinforced by the porous material or the woven or nonwoven fabric of fluorocarbon resin, or the conductive fabric or nonwoven fabric of carbon, metal, or the like, which reduces the damage caused by the separating pawls or thermistor of a copying machine.

In the fixing roller disclosed in the Japanese Publication, in which a porous material of ethylene tetrafluoride resin is impregnated with liquid silicone rubber and polished after hardening, has a Shore hardness of at least 50 degrees. It was impossible to reduce the Shore hardness below 50 degrees by polishing or other methods. Therefore, in a fixing apparatus in which the nip is widened so that the toner is fixed under as low a pressure as possible, which is a current tendency, the use of the fixing roller is limited. According to the fifth embodiment of the present invention, however, it is possible to produce an elastic fixing roller having a Shore hardness of 30 degrees or less by reducing the thickness of the heat-resistant porous material.

The fifth embodiment of the present invention can be made using the same mold and core specifications disclosed in connection with the first embodiment of the present invention and shown in FIG. 3.

To carry out the method of producing this embodiment, for example, a porous tube of ethylene tetrafluoride resin having an outer diameter of 40 mm, a thickness of 0.4 mm, a pore size of 10 μm, and porosity of 85% was set inside a hollow metal mold. A metal core, coated with a primer, was set at the center of the mold using metal core fittings. Liquid silicone rubber (trade name KE 106, made by SHIN-ETSU CHEMICAL Co., Ltd) having a viscosity of 5,000 c.s., was poured between the metal core and the porous tube and hardened at 200° C. for one hour after defoaming. Thereafter, the roller was removed from the mold.

The surface of the rubber roller was polished to an outer diameter of 39.5 mm so that a mixed layer of ethylene tetrafluoride resin and silicone rubber is exposed on the surface. The Shore hardness of the rubber roller was about 45 degrees, only about five degrees higher than that of KE 106 itself.

For test purposes, the fifth embodiment of the rubber roller was used as a heating roller 505 of a plain paper copier (PPC) as shown in FIG. 12. Reference numerals 507, 508, and 509 designate a contacting roller, a web, and a heater, respectively. A sufficient nip width of 4 mm between heating roller 505 and pressing roller 506 was provided. Using that device, a copy having excellent picture quality was obtained with hardly any wrinkles. In addition, the rubber layer was not damaged, thus prolonging the life of roller.

For comparison purposes, a fixing roller as disclosed in the Japanese Publication, in which a porous tube of ethylene tetrafluoride resin existed up to the inside of the fixing roller, the Shore hardness was 70 degrees and therefore sufficient nip width could not be obtained.

Although the present invention has been described in connection with what is considered to be the preferred embodiments, it should be understood by those skilled in the art that the invention is not limited to only those disclosed embodiments, but may include various modifications without departing from the scope or spirit of the invention.

We claim:

1. An elastic fixing roller for use in a fixing stage of a fixing apparatus such as a copying machine, comprising:
   a roller core;
   a layer provided on the outer surface of said roller core made of a reinforcing heat-resistant material impregnated with a reinforcing heat-resistant elastic material that has been hardened after impregnation; and
   a thin film of a heat-resistant elastic material provided on the outer surface of said layer.

2. An elastic fixing roller as set forth in claim 1, wherein said reinforcing heat-resistant material is a porous fluorocarbon resin.

3. An elastic fixing roller as set forth in claim 1 wherein said reinforcing heat-resistant material is either a woven or nonwoven fabric.

4. An elastic fixing roller as set forth in claim 3, wherein said fabric is made of carbon fibers.

5. An elastic fixing roller as set forth in claim 1, wherein said heat-resistant elastic material is liquid silicone rubber having a Shore hardness no higher than 80 degrees after hardening and having a viscosity no higher than 100,000 c.s.

6. An elastic fixing roller as set forth in claim 1, wherein said thin film is no thicker than 0.2 mm.

7. An elastic fixing roller as set forth in claim 1, wherein said heat-resistant elastic material is liquid silicone rubber having a Shore hardness no higher than 100 degrees after hardening at room temperature and having a viscosity no higher than 10,000 c.s.

* * * * *